Dec. 18, 1945. T. JENSEN 2,391,316
WRAPPING MACHINE SAFETY MECHANISM
Original Filed June 5, 1941
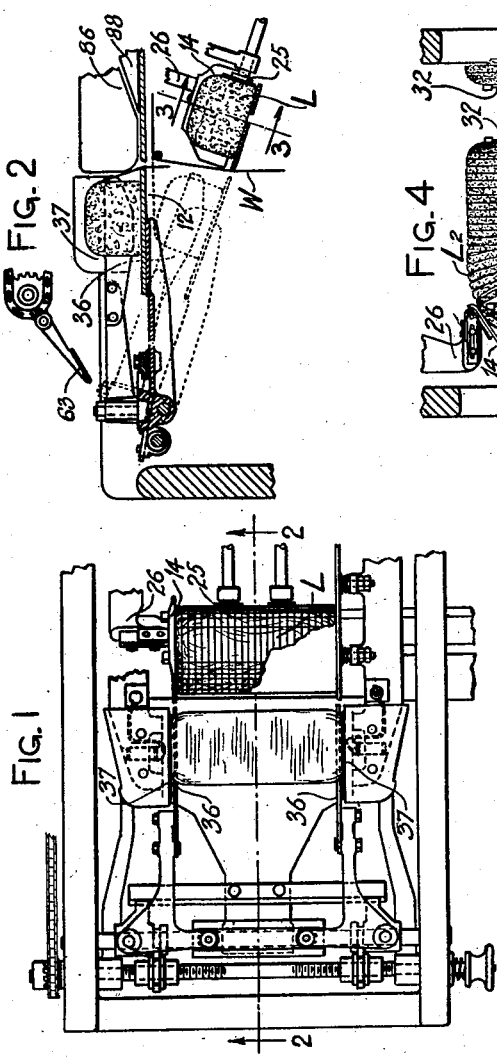
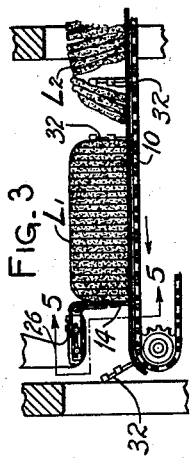
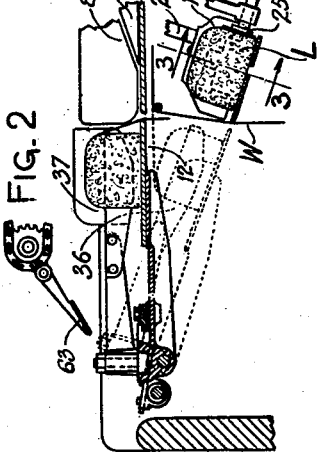
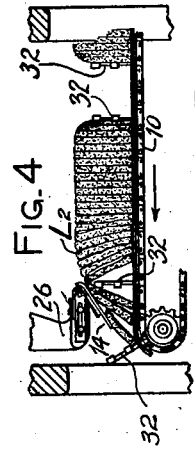
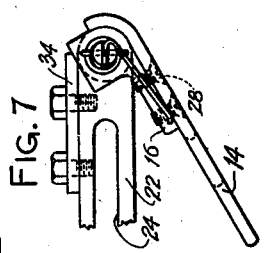
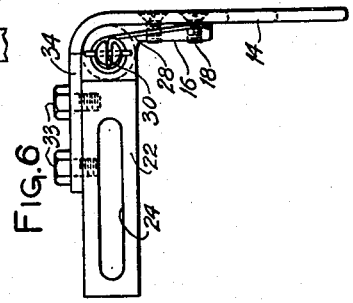
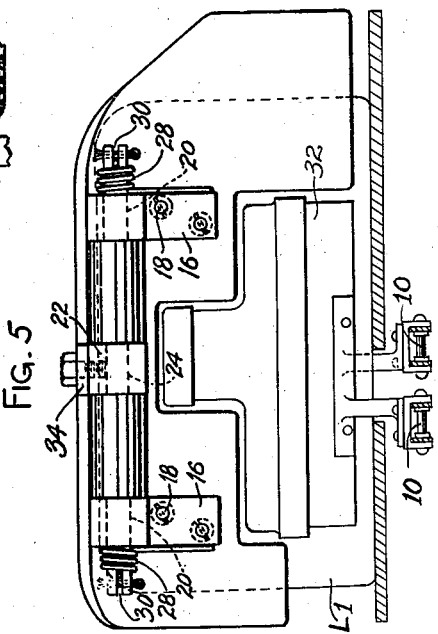
INVENTOR
Thormod Jensen
BY George S. Hastings
ATTORNEY Patented Dec. 18, 1945

2,391,316

UNITED STATES PATENT OFFICE 2,391,316

WRAPPING MACHINE SAFETY MECHANISM

Thormod Jensen, Laurelton, N. Y., assignor to American Machine and Foundry Company, a corporation of New Jersey Original application June 5, 1941, Serial No. 396,713, now Patent No. 2,304,048, dated December 1, 1942. Divided and this application September 19, 1942, Serial No. 458,971

2 Claims. (Cl. 198—24)

This invention relates to wrapping machines and more particularly to bread wrapping machines and safety adjuncts therefor designed to prevent damage to several parts thereof because of the presence of over-sized or improperly positioned articles, such as loaves of bread, which may not be located properly with respect to elements of the machine operating to feed and fold wrappers about the loaf.

This invention constitutes a division of copending application, Serial No. 396,713, filed June 5, 1941, for Wrapping machine safety mechanisms, now Patent No. 2,304,048, granted December 1, 1942.

I have found that occasionally articles, such as loaves of bread being introduced into wrapping machines are improperly arranged on the infeed conveyor with respect to the lugs engaging them for travel to the position where they are advanced to the wrapping mechanism. This means that whenever a stop plate is used for locating loaves of bread moving into the machine for transfer to wrapping mechanism, the lugs which support the infeed flights are apt to be bent or broken because of the pressure exerted by damaged loaves pressing against the infeed lugs or conveyor flights.

It is a further object of my invention, therefore, to provide means such as a safety stop plate which can yield upwardly out of the path of the conveyor lugs in the event that there are improperly positioned articles, such as loaves of bread, either sliced or unsliced on the conveyor, and in this manner prevent breakage of the lugs or flights and loss in time in machine operation. If desired, this plate can be adjustably mounted in order to adapt it for cooperation with any size loaf.

My invention also consists in the provision of a pivotally mounted adjustable loaf stop plate coacting with the infeed mechanism of a wrapping machine, and more particularly a bread wrapping machine for locating a loaf relative to the wrapping mechanism, which plate can yield vertically upward in the event that some unsatisfactory condition exists between the loaves of bread being fed and the infeed conveyor. This arrangement allows the entire loaf to be moved out of the machine on continued forward motion of the conveyor without the necessity of stopping the machine to back up the conveyor manually with a concurrent loss of time and labor.

With these and other objects not specifically mentioned in view, the invention consists in certain combinations and constructions which will be hereinafter fully described, and then set forth in the claims hereunto appended.

In the accompanying drawing which forms a part of this specification, and in which like characters of reference indicate the same or like parts:

Figure 1 is a partial plan view of a wrapping machine showing the improved safety device;

Figure 2 is a sectional elevation taken on line 2—2 of Figure 1;

Figure 3 is a sectional elevation taken on line 3—3 of Figure 2;

Figure 4 is a sectional elevation similar to Figure 3 but showing the pivoted safety loaf stop as it would operate if an improperly arranged article, such as a part of a sliced loaf has passed beyond the point of introduction into the wrapping mechanism;

Figure 5 is a rear elevational view of my improved pivoted safety loaf stop plate;

Figure 6 is a partial end elevation of the safety stop plate shown in Figure 5; and Figure 7 is a view similar to Figure 6 showing the pivoted loaf stop plate in raised position in order to allow an article to be moved therebeneath without damage to the machine;

Referring to the drawing which shows a preferred form of my invention, Figures 1, 2 and 3 disclose mechanism for handling and wrapping articles, such as sliced loaves of bread L, which are advanced into the machine and positioned against a stop plate 14 in the path of a reciprocatory plunger 25 for transfer during a dwell in the intermittent movement of conveyor 10 onto a lifter table 12 of the wrapping machine. Conveyor 10 is provided with a plurality of sets of spaced flights or lugs 32 (Figures 3 and 4) between which loaves of bread are fed either manually or automatically by suitable means (not shown). In the illustrated embodiment sliced loaves are fed between the lugs 32 from a suitable slicing machine (not shown). The lugs 32 are so spaced on their respective supporting chains that loaves can be readily introduced therebetween and advanced into the wrapping machine.

In Figure 3 a sliced loaf of bread $L^1$ properly arranged with respect to infeed conveyor flights 32 of conveyor 10 has been moved into position for introduction into the wrapping machine where it rests with its leading end engaging stop plate 14. Loaf $L^2$, the next loaf to be handled, is shown improperly positioned with respect to the lugs 32 with some of its slices lying on the wrong side of lug 32 whereas the main portion of the loaf is properly positioned. As loaf $L^2$ approaches the point where its leading end should engage the stop plate 14 to locate it for movement onto lifter table 12, the misplaced slices will press against loaf stop 14 to cause it to swing vertically (Figure 4) and thereby allow the separated slices to be moved forward without breaking either the plate 14 or leading lug 32 or both. This action also prevents a machine jam because of the safety construction of the loaf stop. It will be seen, therefore that the misplaced slices of loaf $L^2$ will be ejected easily from the machine as a result of its continued movement and manual backing on the machine is eliminated. If desired, the main portion of loaf $L^2$ can be removed prior to wrapping or it can be wrapped and later discarded as a "cripple" without causing stoppage of the machine or breakage of any part of the conveyor.

As illustrated in Figures 7, 8 and 9, plate 14 may be provided with two hinged lugs 16 attached by screws 18 and mounted to swing on trunnions 20 of a T-shaped bracket 22. An elongated slot 24 formed in bracket 22 permits bracket 22 to be adjustably secured to a stationary member 26 depending from the frame of the machine and fastened thereto in any suitable manner. Slot 24 is formed of a length sufficient to allow the adjustment of the loaf stop 14 laterally of the machine to suit various lengths and types of products. Springs 28, each having one end secured in slots 30 formed in trunnions 20 and the other end bearing against plate 14, provide suitable yielding resistance against deflection of the plate 14 upward under ordinary conditions but will yield and permit the plate to swing away (Figures 4 and 9) whenever any obstruction which might damage the machine occurs.

As shown in Figure 7, plate 14 is shaped to allow passage of flights or lugs 32 of conveyor 10, but the size of the slices of a loaf is such that if they extend beyond the limits of the passage opening in plate 14 they can force the plate to swing vertically out of the way whenever a condition such as shown in Figure 4 exists. A stop plate 34 secured to bracket 22 by bolts 33 maintains plate 14 normally in a vertical position.

It will be seen by referring to Figures 1 and 2 that when a loaf has been properly positioned against the yielding stop plate 14, plunger 25 operated by conventional means (not shown), moves it onto lifter table 12 out of the path of lugs 32 of conveyor 10. In its travel from feed conveyor 10 onto lifter table 12, loaf L (Figure 2) engages a wrapper web W which is draped in its path and the wrapping proceeds in a manner similar to that set forth in Armstrong Patent No. 1,668,854, granted February 28, 1928.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. Infeed mechanism for a wrapping machine comprising an intermittently moving conveyor, a plurality of sets of spaced article engaging lugs carried by and extending upwardly from said conveyor, said lugs having a cross sectional area less than articles engaged and advanced thereby, a pusher movably transverse of said conveyor between said lugs to eject articles from between said lugs, a stop plate provided with an opening through which said lugs pass, said stop plate being constructed and arranged to engage each leading end of an article after the lug engaging said leading end of said article passes into said opening to limit the forward movement of said article and guide said article during its ejection from between said lugs, means for pivotally mounting said plate for upward swinging movement whenever an article is so improperly arranged relative to said lugs on said conveyor as to obstruct the movement of the leading lug of the set into said opening, and means for yieldingly urging said plate towards articles advanced by said conveyor into article stopping position.

2. Infeed mechanism for a wrapping machine comprising an intermittently moving conveyor, a plurality of sets of spaced article engaging lugs carried by and extending upwardly from said conveyor, said lugs having a cross sectional area less than that of the articles advanced by said conveyor, a lifter table, a pusher movable transversely of said conveyor between said sets of lugs to eject articles from between said lugs onto said lifter table, a stop plate provided with an opening through which said lugs pass, said stop plate being constructed and arranged to engage each leading end of an article after the lug engaging said leading end passes into said opening to limit the forward movement of an article located between said lugs and guide said article during its ejection by said pusher onto said lifter table, means for pivotally mounting said plate for upward swinging movement out of the path of travel of said lugs whenever an article is so improperly arranged on said conveyor as to obstruct the movement of the leading lug of a set of lugs into said opening, means for yieldingly urging said plate towards articles advanced by said conveyor into article stopping position, and devices for adjusting said plate lengthwise of said conveyor.

THORMOD JENSEN.